United States Patent Office 2,947,823
Patented Aug. 2, 1960

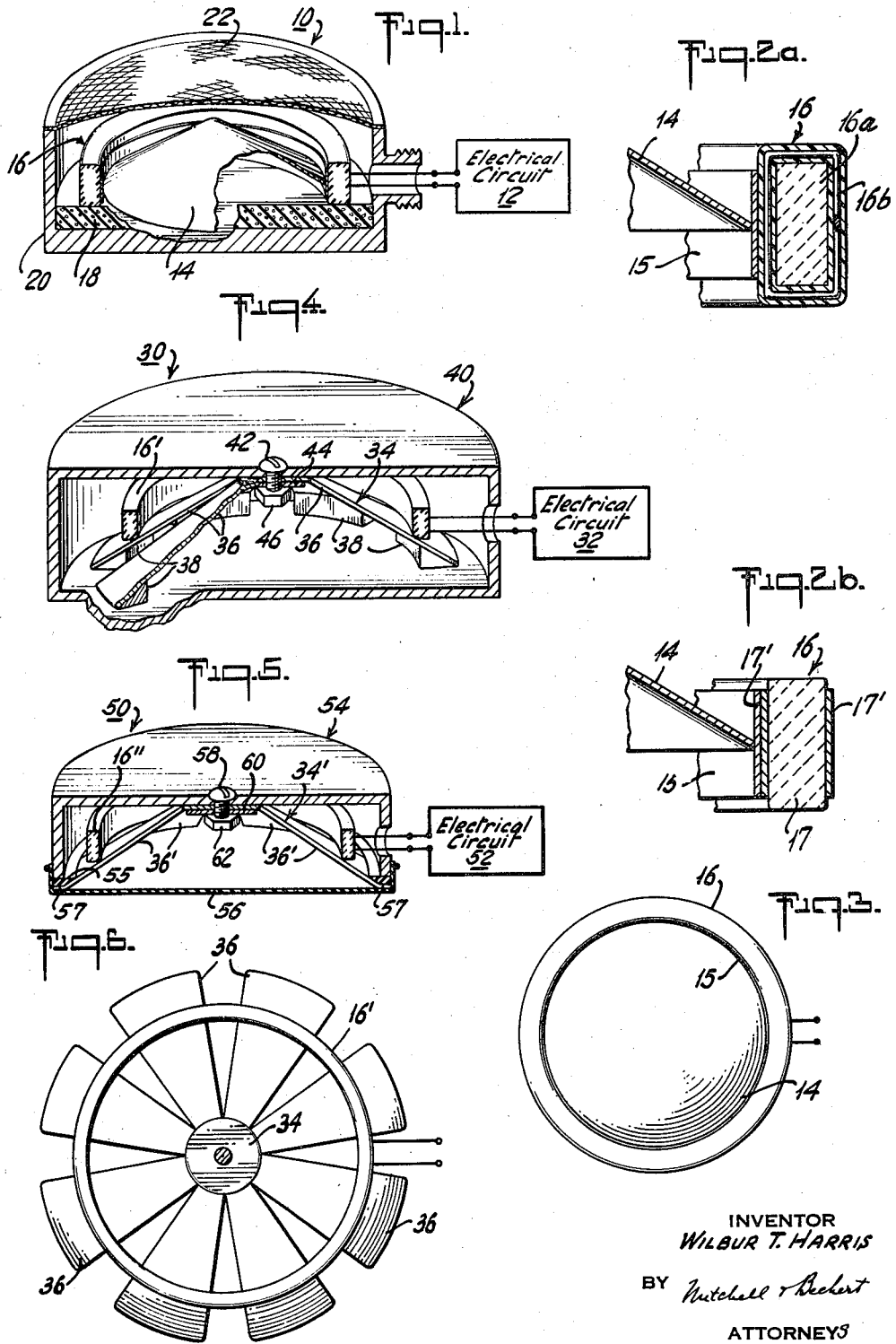

2,947,823

ELECTROMECHANICAL TRANSDUCER

Wilbur T. Harris, Southbury, Conn., assignor to The Harris Transducer Corporation, Woodbury, Conn., a corporation of Connecticut Filed Jan. 31, 1958, Ser. No. 712,433

1 Claim. (Cl. 179—110)

This invention relates to electromechanical transducers and more particularly to such devices which respond to fluctuating mechanical forces essentially along a single axis.

It is a general object of the invention to provide an improved transducer for converting mechanical forces to an electrical output.

It is another general object of the invention to provide a transducer responsive to mechanical forces which, while being small and easily assembled, is extremely sensitive to small forces or to slight changes in applied forces.

It is a specific object of one aspect of the invention to provide a compact microphone.

It is another specific object of a second aspect of the invention to provide a compact and rugged accelerometer.

It is a further specific object of the invention to provide a compact and sensitive stethoscope employing a transducer in accordance with another aspect of the invention.

Still further specific objects are to provide magnetostrictive and electrostrictive devices meeting the above objects.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a perspective view, partially in cross-section, showing a microphone in accordance with one embodiment of the invention;

Figs. 2a and 2b are enlarged sectional views of parts of alternative versions of the ring-like impedance element employed in the microphone of Fig. 1;

Fig. 3 is a top view of internal parts of the microphone of Fig. 1;

Fig. 4 is a perspective view, partially in cross-section, showing an accelerometer in accordance with a second embodiment of the invention;

Fig. 5 is a perspective view partially in cross-section of a stethoscope in accordance with a further embodiment of the invention;

Fig. 6 is a top view of the segmented conical coupling member and ring-like impedance element for use in either the accelerometer of Fig. 4 or the stethoscope of Fig. 5.

Briefly, in accordance with the general aspect of the invention, a radially strictive transducer is provided for converting varying axially directed mechanical forces to correspondingly varying changes in electrical quantities. The transducer comprises a stiff thin-walled substantially conical coupling member for receiving the mechanical forces, applied axially and at the apex of the cone. A ring member of radially strictive material is fixed to the conical coupling member, and an electrical output is developed in response to mechanical-stress changes in the material of the ring member. Any mechanical forces, such as those related to acoustical pressures, inertial accelerations, or mechanical vibrations during the reception of mechanical energy, are transformed to circumferential strains in the ring member and a corresponding electrical output, observable at the leads to the ring member.

Referring to Figs. 1 and 3, a microphone 10 is shown coupled to an electric circuit 12. The microphone 10 comprises a thin-walled hollow metallic cone 14 with a radially strictive ring-shaped impedance element 16 bonded to its base periphery. The mass of element 16 preferably substantially exceeds that of cone 14. A cellular rubber pad 18 supports the impedance element 16 in a housing 20. The wall of the housing 20 opposite the hollow metallic cone 14, is a perforated screen 22 to permit the access of acoustical energy to the hollow metallic cone 14.

For the form of Fig. 2a, the impedance element 16 is magnetostrictive and comprises a ring-shaped core of magnetostrictive material, such as a spiral-laminated development of magnetostrictive strip material or, as in the form shown, a ferrite 16a having magnetostrictive properties. Toroidal winding 16b is disposed about the ferrite ring 16a to form a substantially toroidal inductor. A plastic potting or encapsulation completely encases both the toroidal winding and the ferrite ring, lending ruggedness to the structure while not affecting its magnetic properties. The magnetostrictive impedance element 16 is bonded to the base periphery of the hollow metallic cone 14, as by way of a peripheral shoe element 15, as shown in Fig. 2.

During operation, acoustical pressures passing through the screen 22 exert fluctuating mechanical forces on the hollow metallic cone 14. These forces are predominantly axially of the cone 14 and are transformed by cone 14 into fluctuating predominantly radial forces on the magnetostrictive impedance element 16, due to the relatively great inertia of ring 16 compared with that of cone 14. The radial components of these forces introduce circumferential strains in the ferrite ring 16a, and a voltage output is developed for amplification or other processing at circuit 12.

Not only are applied fluctuating pressures reflected as a fluctuating voltage output, but the strain changes in the core 16a also effect corresponding changes in the reluctance of the element 16. Thus, when the electrical circuit 12 is an alternating-current bridge, with the impedance element 16 as one of the arms of the bridge, a modulator is attainable, that is, the output signal from the alternating-current impedance bridge will vary with the impedance of the magnetostrictive impedance element in response to the changes in acoustical pressure, it being noted of course that the carrier frequency is elevated above the range of applied acoustic frequencies. Although the electrical circuit 12 is disclosed as an alternating-current impedance bridge, any suitable modulator which includes an alternating-current carrier source can equally be employed.

In the embodiment of Fig. 2b, the ring element 16 is piezoelectric and may comprise an annular core 17 of suitably polarized piezoelectric ceramic (such as barium titanate) having radially inner and outer foil electrodes 17'—17' to which the output lead connections are made. Other parts are as described previously and are therefore given the same reference numbers. Electrical capacitance changes and voltage fluctuations appear in the output of the piezoelectric version of Fig. 2b analogously to the impedance and voltage changes in the output of the magnetostrictive version, and conventional signal-processing techniques may be employed at 12.

Fig. 4 shows an accelerometer 30 connected to an electrical circuit 32 which may be a conventional alternating-current impedance bridge. The accelerometer 30 comprises a radially split conical spring 34 which defines a plurality of angularly spaced segments 36. Fixed to the base peripheries of each of the segments 36 is a mass 38. A radially strictive impedance element 16', which may be similar to that described at 16 in Figs. 2a and 2b, is bonded to the outer surface of each of the segments 36 (Fig. 6), the radius of ring 16' being such in relation to the size of segments 36 that it is bonded to each segment at a location intermediate mass 38 and the radially inner limit of the slits between segments 36. The split conical spring 34 is shown fixed to the housing 40 by means of a screw 42, a washer 44 and a nut 46. It should be noted that the dimensions of the washer 44 and nut 46 are chosen to permit free flexure of the segments 36.

In operation, the accelerometer 30 is sensitive to accelerations along the axes of the split conical spring 34 and of the impedance element 16'. Whenever there is such an axial acceleration, the masses 38 exert forces which are transformed to radial stresses in the core of the impedance element 16'. In the magnetostrictive version, the resulting circumferential strains change the magnetization of the core material, and the impedance of the magnetostrictive impedance element 16' changes. This change in impedance disrupts the balance of the alternating-current impedance bridge of the electrical circuit 32. A measure of the unbalance indicates the degree of acceleration of the masses 38. Analogous outputs are developed for the piezoelectric modification.

Fig. 5 shows a stethoscope 50 which is coupled to an electrical circuit 52, which may also be an alternating-current impedance bridge. The stethoscope 50 is similar to the accelerator 30, and primed reference characters are employed to point up the similarities.

In particular, a split conical spring 34' having segments 36', is bonded to a radially strictive impedance element 16" in the same manner as the corresponding elements of the accelerometer 30 shown in Fig. 4. It should be noted, however, that there are no masses fixed to the base peripheries of the segments 36'. These base peripheries 36' serve as fingers or feelers which sense vibrations in a contacted body. The split conical spring 34' is fixed to the housing 54 by means of the screws 58, the washer 60 and the nut 62. The base of the housing opposite the base peripheries of the segments 36' is covered with a pliable membrane 56 to permit a substantially free transmission of generally axially directed vibrations to the segments 36', and a sponge-rubber or similarly compressible ring 55 axially separates the rim 54' of the case 54 from the adjacent flattened ends 57 of the segments 36'. Any vibrations are converted to circumferential strains in the core of the impedance element 16", and a correspondingly changing impedance is presented to the alternating-current impedance bridge in the electrical circuit 52.

In magnetostrictive versions of the invention, it should be noted that the core rings in each of the impedance elements may be magnetically biased for more reliable and sensitive operations. Magnetic bias is readily obtainable by using permanently magnetized ferrites, by employing an additional winding connected to a direct-current source, or by superimposing a direct-current component on an alternating-current signal generated in the electrical circuits 12, 32 and 52.

It will be seen that I have described improved radially strictive transducers which convert mechanical forces to electrical impedances. The transducers shown are compact, rugged and highly sensitive, particularly to mechanical forces along the transducer axis. In all cases, the device transforms predominantly axial forces into radial deformations of a ring, and the mechanical advantage in such transformation is a function of the stiffness and apex angle of the cone. Preferably, the apex angle is large, as shown, for greater sensitivity.

While the invention has been described in detail in connection with the preferred forms illustrated, it will be understood that modifications may be made within the scope of the invention as defined in the claim which follows.

I claim:

A microphone comprising a conical surface member of a stiff material, a ring of magnetostrictive material having a cylindrical radially inner surface, a winding disposed about said ring for coupling to an electrical circuit, cylindrical shoe means concentric with said ring and located radially inside the part of said winding adjacent said radially inner surface, the periphery of said conical surface member abutting the inner surface of said shoe means at a location intermediate the axial ends of said shoe means, bonding means securing said shoe means to said ring, and said ring having a mass substantially exceeding that of said conical surface member, whereby varying acoustical pressures exerted on said conical surface member may be transformed to a varying electrical output of said winding.

References Cited in the file of this patent

UNITED STATES PATENTS

| | | |
|---|---|---|
| 2,477,596 | Gravley | Aug. 2, 1949 |
| 2,487,962 | Arndt | Nov. 15, 1949 |
| 2,607,858 | Mason | Aug. 19, 1952 |
| 2,778,881 | Fryklund | Jan. 22, 1957 |
| 2,836,738 | Crownover | May 27, 1958 |